US012709554B2

(12) United States Patent
Sauvignet et al.

(10) Patent No.: US 12,709,554 B2
(45) Date of Patent: Aug. 18, 2026

(54) FLUID TREATMENT FACILITY WHICH OPERATES UNDER PRESSURE AND IMPLEMENTS A FLUIDISED BED OF ADSORBENT MEDIA PARTICLES

(71) Applicant: Veolia Water Solutions & Technologies Support, Saint-Maurice (FR)

(72) Inventors: Philippe Sauvignet, Maen Roch (FR); Patrick Exposito, Montauban (FR); Philippe Angot, Thorigne-Fouillard (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 343 days.

(21) Appl. No.: 18/694,466

(22) PCT Filed: Sep. 23, 2022

(86) PCT No.: PCT/EP2022/076581
§ 371 (c)(1),
(2) Date: Mar. 22, 2024

(87) PCT Pub. No.: WO2023/046925
PCT Pub. Date: Mar. 30, 2023

(65) Prior Publication Data

US 2024/0383778 A1 Nov. 21, 2024

(30) Foreign Application Priority Data

Sep. 23, 2021 (FR) ...................................... 2110051

(51) Int. Cl.
*C02F 1/28* (2023.01)

(52) U.S. Cl.
CPC ........ *C02F 1/281* (2013.01); *C02F 2201/003* (2013.01); *C02F 2301/04* (2013.01); *C02F 2301/066* (2013.01)

(58) Field of Classification Search
None
See application file for complete search history.

(56) References Cited

U.S. PATENT DOCUMENTS 6,132,611 A 10/2000 Yuen
2009/0173683 A1 7/2009 Burrows

FOREIGN PATENT DOCUMENTS

CN 105916562 A * 8/2016 .............. C02F 1/286
CN 106830522 A * 6/2017 ................ C02F 9/00

(Continued)

*Primary Examiner* — Krishnan S Menon
(74) *Attorney, Agent, or Firm* — COATS & BENNETT, PLLC

(57) ABSTRACT

The invention relates to a facility for the treatment of a fluid, comprising a reactor (1) that accommodates a bed of adsorbent media particles, means (2) for injecting and distributing fluid to be treated, which means are in the bottom part of said reactor (1) and are intended to form an ascending flow of fluid within said reactor (1) and allow said bed of adsorbent media particles to be fluidised and expanded, and means (3) for recovering the fluid that has passed within said bed of adsorbent media particles fluidised in this way, characterised in that said reactor (1) is a closed reactor that forms an enclosure making it possible to implement said treatment under pressure, said enclosure having a bottom (11) that accommodates said means (2) for injecting and distributing the fluid to be treated, a substantially cylindrical central body (12) forming a fluidisation column, a substantially cylindrical peripheral body (14) defining an annular chamber (15) around said substantially cylindrical central body (12) delimiting a fluidisation column, said annular chamber (15) accommodating at least one layer of a granular or (Continued)

pulverulent material, a curved cover (13) forming a baffle making it possible to transform said ascending flow into a homogeneous descending flow and to direct said descending flow towards said recovery means (3) via said annular chamber (15).

17 Claims, 3 Drawing Sheets

(56) References Cited

FOREIGN PATENT DOCUMENTS

| | | | | | |
|---|---|---|---|---|---|
| CN | 108467096 | A | * | 8/2018 | ............ C02F 1/5281 |
| CN | 113045121 | A | * | 6/2021 | ................ C02F 9/00 |
| CN | 113336324 | A | * | 9/2021 | .............. C02F 3/085 |
| CN | 113371886 | A | * | 9/2021 | ................ C02F 1/66 |
| SE | 414373 | B | * | 7/1980 | ................ B01J 8/26 |

* cited by examiner

FLUID TREATMENT FACILITY WHICH OPERATES UNDER PRESSURE AND IMPLEMENTS A FLUIDISED BED OF ADSORBENT MEDIA PARTICLES

FIELD OF THE INVENTION

The present invention relates to the field of treatment of fluids such as waters by passage in a reactor containing particles of adsorbent media.

More specifically, the invention relates to a facility implementing such particles in the form of a fluidized bed.

The present invention is suitable for the reduction of the organic substances, the micropollutants and/or the metal ions in water using activated carbon as adsorbent media.

PRIOR ART

In the prior art, there are various facilities for the treatment of fluids such as waters implementing fluidized beds of adsorbent media particles making it possible to fix thereon different types of undesirable compounds present in the fluids in question. Such facilities make it possible to maximize the adsorbent action of these particles while minimizing the pressure drops caused by the fixed beds of particles.

The minimum fluidization velocity of a media bed made up of solid particles is the minimum velocity that a fluid circulating from bottom to top must have to allow slight movement of the particles which become suspended. It depends on the size and density of the solid particles as well as on the viscosity of the fluid. When the fluid velocity becomes greater than the minimum fluidization velocity, the bed of solid particles experiences an expansion phenomenon in the reactor, characterized by an expansion rate. The expansion rate corresponds to the increase of the bed height during the passage of the fluid to the fluidization velocity relative to the bed height at rest. For a given bed of particles, the expansion is equivalent to the suspension of the particles. The expansion of the particles changes according to the upward velocity. By gradually increasing this velocity, the expansion switches from a state of immobility to a state where the particles become suspended to obtain a height of up to twice the initial height (height at rest). In this case, the particles become independent of each other.

In practice, in order to use all the mass of activated carbon present in the reactor, the bed of activated carbon must generally be fluidized at an expansion rate which can be theoretically comprised between 10 and 100%. Below 10%, the specific surface of the media may not be fully used for adsorption.

Thus, the implementation of the facilities comprising such fluidized beds requires increased control of the velocity of upward fluid making it possible to find the least bad compromise, for a given range of particle size distribution, between on the one hand sufficient expansion of the bed, in particular of the particles of larger particle size distribution, and on the other hand the limited leakage of the particles of smaller particle size distribution. However, it is almost impossible to favor one without it being to the detriment of the other.

Patent application FR2874913 thus describes a water treatment method implementing a fluidized bed of activated carbon in a reactor, in which the velocity of fluidization of the activated carbon and the characteristics of the latter must be precisely chosen to ensure a gravity separation, in the upper part of the reactor, between the activated carbon particles and the fluid, the treated fluid essentially free of activated carbon being recovered by overflow when leaving.

The leakage of activated carbon is indeed particularly detrimental since it leads to additional costs resulting in particular from the reinjection of new activated carbon to compensate for this loss. In addition, it causes an unnecessary overload of suspended matter (SM) in the treated fluid, which overload must be absorbed by filters disposed downstream of the upward flow treatment method which therefore tend to clog more quickly.

Patent application FR3081458 describes a method for treating a fluid implementing an upward flow reactor containing a fluidized bed of adsorbent media particles and which has, in its upper part, fluid deflection means intended to reduce the velocity of the upward fluid flow and making it possible to form a fluid tranquility area. The adsorbent media particles, in particular those of smaller size, abut against the deflection means and, due to the slowdown of the velocity of the upward flow at the level of the deflection means, fall back towards the bottom of the reactor. The downstream area is thus virtually free of adsorbent media particles and a treated fluid free of suspended adsorbent media particles can be recovered.

All these facilities have the common point of operating at atmospheric pressure. The waters treated in the fluidized bed of adsorbent media particles are therefore collected by overflow in the upper part of the structures.

This operation is a gravity operation and at atmospheric pressure. However, it is often necessary to convey the fluid recovered by overflow to additional treatment steps. Thus, in the context of water drinkability, such steps can in particular consist of filtration, disinfection or even re-mineralization in order to comply with regulatory levels.

To reach the additional stages in question, the water recovered by overflow in the upper part of the facilities must therefore be pumped towards them, which entails the need to use additional equipment which increases the cost of the facilities and their implementation.

To avoid the use of such pumping, altimeter setting subjections can also be implemented in some cases. However, the constraints relating to the facility sites do not always allow envisaging them.

It will also be noted that, in the context of the implementation of the reactors with a fluidized bed of activated carbon of the prior art for the treatment of waters, a difficulty encountered consists of the variability of the content of pollutants to be adsorbed present in the waters to be treated. Thus, some waters may present pollution peaks which can be quite difficult to predict. To enable the treatment of these pollution peaks, it is often necessary to add, as a preventative measure, significant quantities of activated carbon to the reactors. Such overdoses imply an increase in the quantities of activated carbon used and therefore an increase in the costs of implementation of the facilities. Sensors and automations can also be implemented to better manage these untimely peaks of pollution. However, such equipment also increases the cost of facilities and the costs of their implementation.

Objectives of the Invention

One objective of the invention is to propose a facility for the treatment of a fluid on a fluidized bed of adsorbent media particles making it possible to dispense with the use of intermediate pumps or altimeter setting subjections to convey the fluid having passed through the fluidized bed towards at least one subsequent treatment step.

One objective of the invention is to describe such a facility which, in at least some embodiments, integrates at least one subsequent treatment step and which has an optimized footprint.

Yet another objective of the present invention which, in at least some embodiments, integrates at least one subsequent treatment step and allows optimized treatment velocities in this step.

Another objective of the present invention is to describe a system comprising several facilities of this type with common means for supplying treated water.

DISCLOSURE OF THE INVENTION

These objectives, as well as others which will appear subsequently, are achieved thanks to the invention which relates to a facility for the treatment of a fluid comprising:

- a reactor accommodating a bed of adsorbent media particles;
- means for injecting and distributing a fluid to be treated disposed in the lower part of said reactor intended to form an upward fluid flow within said reactor and allowing the fluidization and expansion of said bed of adsorbent media particles;
- means for recovering the fluid having passed through said bed of adsorbent media particles thus fluidized,
- characterized in that said reactor is a closed reactor forming an enclosure making it possible to implement said treatment under pressure, said enclosure having:
  - a bottom accommodating said means for injecting and distributing the fluid to be treated;
  - an essentially cylindrical central body forming a fluidization column;
  - preferably an essentially cylindrical peripheral body defining an annular chamber around said essentially cylindrical central body delimiting a fluidization column, said annular chamber accommodating at least one layer of a granular or powder material;
  - a curved cover forming a deflector making it possible to transform said upward flow into a homogeneous downward flow and to direct said downward flow towards said recovery means preferentially via said annular chamber.

Providing the fluidization of a bed of adsorbent media particles in a closed upward flow reactor had, to the Applicant's knowledge, not been proposed or suggested in the prior art. This solution makes it possible to implement the treatment no longer at atmospheric pressure but at a higher pressure, and thus to avoid any breaking load of the fluid when it leaves the reactor. Thus, it is possible thanks to the invention to eliminate the need to resort to intermediate pumping of this fluid for its conveyance towards one or several additional treatment steps and/or to overcome any altimeter setting subjections of this reactor for such conveyance without pumping. Compared to the prior art, such a facility is therefore more inexpensive to produce but also to implement, the energy that would be necessary for the intermediate pumping operations not being used.

The cover closing the reactor of the facility according to the invention makes it possible to reverse the direction of the fluid flow, that is to say to transform the upward fluid flow having passed through the fluidized bed of adsorbent media particles into a downward fluid flow towards the discharge means. This downward flow can then directly supply one or several additional treatment steps without the need for pumping or without the need to provide the reactor at an altitude higher than that of a device for such additional treatments. Regarding this cover, it is noted that its curved shape promotes this function.

Moreover, advantageously, the invention makes it possible to add within the same facility one or several steps of additionally treating the fluid having passed through the fluidized bed of adsorbent media particles by providing an essentially cylindrical peripheral body defining an annular chamber around said essentially cylindrical central body forming a fluidization column.

Such an annular chamber provided around the central body makes it possible to optimize the footprint of the facility according to the invention compared to those of facilities that would comprise on the one hand a reactor of the prior art operating at atmospheric pressure, on the other hand a device for the subsequent treatment of the fluid coming from this reactor, and finally altimeter setting subjections or pipes equipped with pumps between such a reactor and such a device.

Such a configuration also makes it possible to reduce the cost of the facility.

Preferably, the adsorbent media particles are grains or micrograins chosen from activated carbon, resin, clay, zeolite, manganese dioxide, iron oxyhydroxide, or mixtures thereof.

Advantageously, said powder or granular material present in said annular chamber is chosen from the group made up of adsorbent materials, filtration materials, re-mineralization materials, materials with a catalytic effect (such as for example manganese oxide . . . ).

When it is an adsorbent material, the latter can be the same as the one used in the fluidization column. Thus, the presence of this additional adsorbent material in the annular chamber could eliminate the need to overdose the adsorbent material in the fluidization column, in particular to prevent peaks of pollutants in the entering fluid to be treated and to use sensors or automations to minimize these overdoses. The redundant treatment of the fluid by the adsorbent media first in the fluidization column then in the annular chamber will also offer maximum treatment safety.

When the material implemented in the annular chamber will be a filtration material, the latter can be used to retain any suspended matter present in the fluid when it leaves the fluidized bed of adsorbent media particles, and in particular to retain this media when it will have been caused to leak from the fluidization column.

According to one particularly interesting variant, said annular chamber accommodates at least two layers of powder or granular materials. The choice of these materials will be made according to the resource to be treated.

Thus, for example, said annular chamber accommodates a sand layer, and at least one layer of a material chosen from granular activated carbon, anthracite, sand, manganese oxide, limestone provided above said sand layer.

Advantageously, said means for recovering the fluid having passed through said fluidized bed and possibly through said at least one layer of powder or granular material provided in said annular chamber comprise a discharge pipe provided in the lower part of said reactor.

Preferably, the facility comprises means for washing said at least one layer of granular or powder material provided in said annular chamber. Such washing will be preferably carried out against the current by passage of a wash fluid in an upward current into the annular chamber.

According to one variant, said annular chamber comprises a perforated floor on which said at least one layer of granular or powder material rests, means for injecting wash waters provided under said floor, means for recovering dirty wash water provided in the upper part of said annular chamber.

Advantageously, said means for recovering dirty wash water include a peripheral chute.

Also advantageously, the facility comprises additional means chosen from means for injecting particles of new adsorbent media, means for extracting particles of used adsorbent media and means for re-circulating the treated fluid.

The facilities according to the invention can be combined into a system by bringing together two or more that can operate in parallel. The means for supplying water to be treated to the reactors thereof may be common and provided with a system of valves making it possible to distribute the waters to be treated in one or several of these reactors.

DESCRIPTION OF THE EMBODIMENTS

The invention, as well as the various advantages it presents, will be better understood thanks to the following description of different embodiments given with reference to the figures.

First Embodiment

Figure 1:
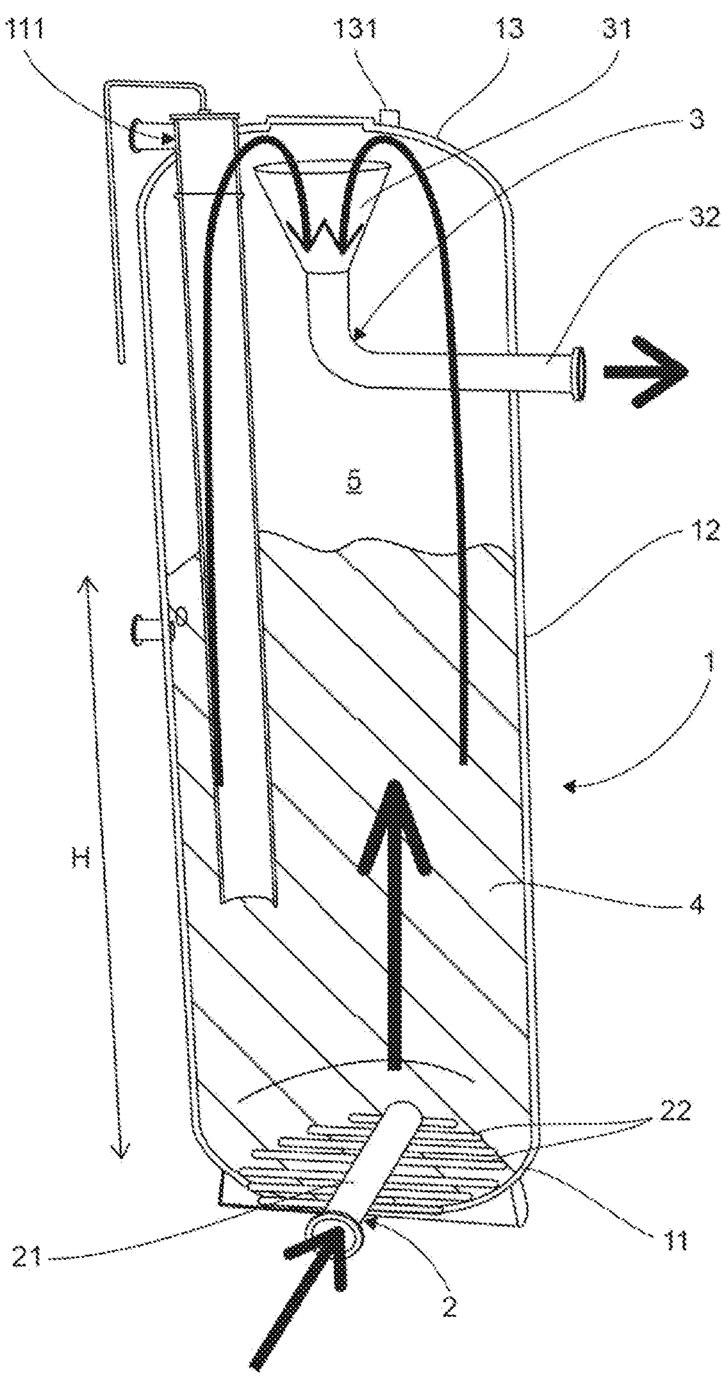
FIG. 1 represents a sectional view of a first embodiment of a facility according to the present invention.

With reference to FIG. 1, a facility comprises a reactor 1 accommodating a bed of adsorbent media particles, for example, activated carbon in coagulated powder, in grains, or in micrograins.

This facility also comprises means 2 for injecting under pressure a fluid to be treated such as polluted water in the lower part of this reactor 1 making it possible to form an upward flow of water within it at a velocity allowing the fluidization and expansion of the bed of activated carbon while avoiding the leakage of this material from the reactor 1.

These injection means comprise a main pipe 21 and a plurality of auxiliary pipes 22 connected thereto making it possible to essentially uniformly distribute the waters in the reactor 1.

Means 3 for recovering the water having passed through the fluidized bed of adsorbent media particles, essentially freed from the adsorbed pollutants thereon, are provided in the upper part of the reactor 1. These means 3 comprise a funnel-shaped element 31 connected to a discharge pipe 32.

In the facility represented, the reactor 1 is equipped with means 111 for delivering adsorbent media particles. The reactor also comprises a bottom 11, a central cylindrical body 12 delimiting a fluidization column accommodating the fluidized bed of activated carbon and a curved cover 13. On the cover 13, an air vent 131 is mounted. This reactor 1 therefore forms an enclosure by definition closed allowing a treatment under pressure of the water passing therethrough.

The displacement of water within the reactor 1 during its treatment therein is symbolized by the arrows shown in FIG. 1.

The water to be treated arrives under pressure in the reactor 1 via the pipe 21 of the means 2 provided in the bottom 11 thereof and is essentially uniformly distributed into an upward flow in the reactor 1 via the pipes 22 connected to this pipe 21. Thanks to the arrival under pressure of this water in the reactor 1, the bed of activated carbon present therein is expanded and fluidized. The fluidization velocity is chosen to allow the expansion of the fluidized bed 4 up to a certain height H from the bottom 11 of the reactor while providing above the fluidized bed 4 an area 5 essentially free of activated carbon.

After having passed through the fluidized bed 4 of activated carbon, the pressurized water abuts against the cover 13 of the reactor which acts as a deflector and makes it possible to reverse the direction of the water flow to transform it into a downward flow and direct it towards the funnel-shaped element 31 then the pipe 32 of the discharge means 3. Always arriving under pressure in these discharge means 3, the water flow then experiences no breaking load when leaving the reactor 1 and can then be conveyed to one (or several) additional treatment steps without resorting to pumping of water towards it and without subjecting this conveyance to altimeter setting subjections between the reactor 1 and a device for the implementation of this additional step.

Second Embodiment

Figure 2:
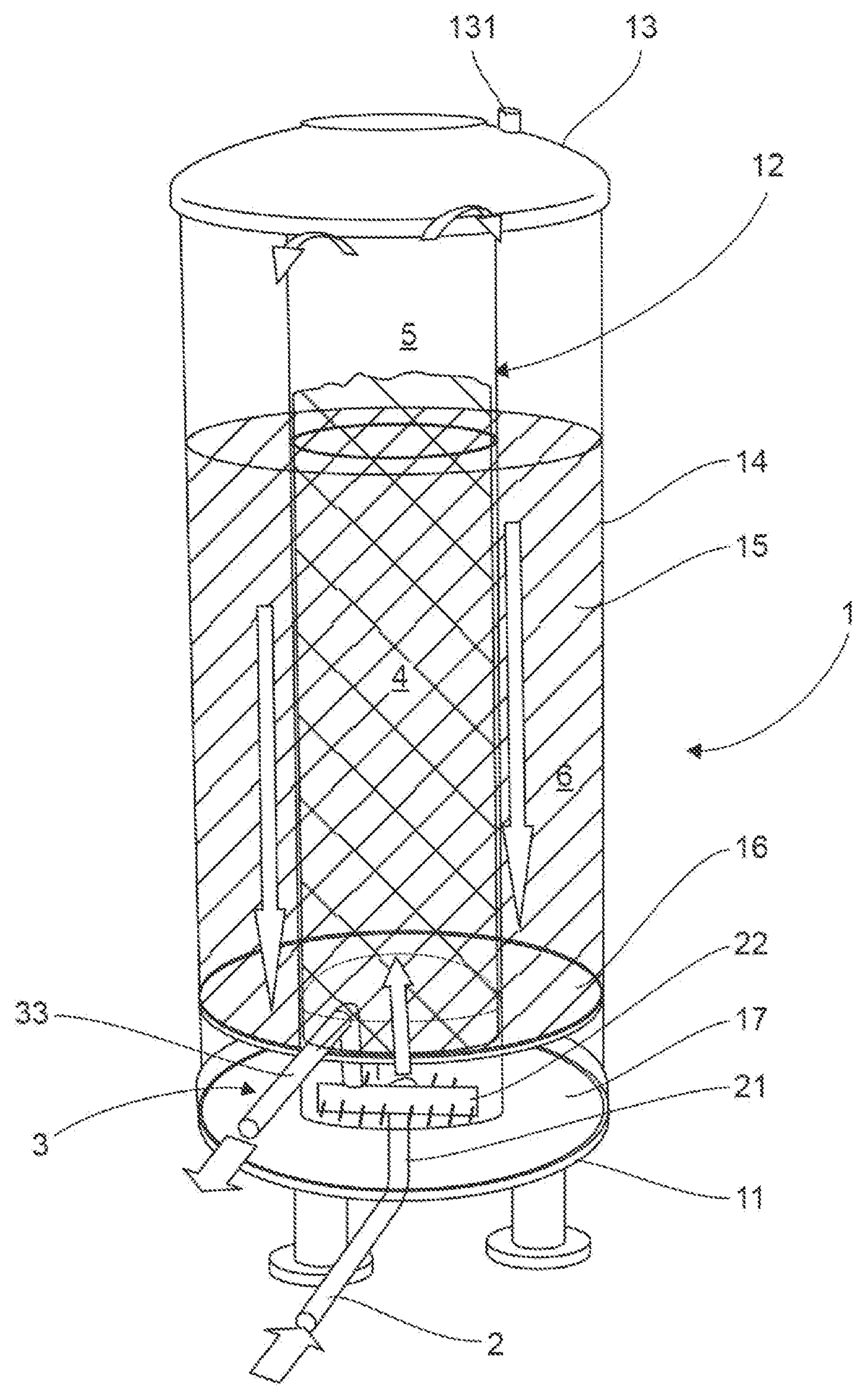
FIG. 2 represents a sectional view of a second embodiment of a facility according to the present invention.

With reference to FIG. 2, a second embodiment of the invention comprises a reactor 1 accommodating a bed of adsorbent media particles, for example, activated carbon in coagulated powder, in grains or in micrograins.

This facility also comprises means 2 for injecting under pressure a fluid to be treated such as polluted water in the lower part of this reactor 1 making it possible to form an upward water flow within it at a velocity allowing the fluidization and expansion of the bed of activated carbon while avoiding the leakage of this material from the reactor 1.

These injection means comprise a main pipe 21 and a plurality of auxiliary pipes 22 connected thereto and making it possible to essentially uniformly distribute the waters in the reactor 1.

Means 3 for recovering the water having passed through the fluidized bed of adsorbent media particles are provided in the lower part of the reactor 1. These means 1 comprise a discharge pipe 33.

In the facility represented in FIG. 2, the reactor 1 comprises a bottom 11, a central cylindrical body 12 delimiting a fluidization column and a cylindrical peripheral body 14 defining an annular chamber 15 around said central cylindrical body 12.

The annular chamber 15 accommodates a layer 6 of a granular or powder material, such as for example sand, making it possible to filter the waters coming from the fluidization column in order to reduce their content of suspended matter. This layer 6 of granular or powder material rests on a perforated floor 16 delimiting a space 17 with the bottom 11 of the reactor 1 which communicates with the pipe 33 of the discharge means 3. The reactor also comprises a curved cover 13. An air vent 131 is mounted on the cover 13. Means for loading (not represented) the granular or powder material into the annular chamber 15 are provided.

This reactor 1 therefore forms an enclosure by definition closed allowing a treatment under pressure of the water passing through it.

The displacement of water within the reactor 1 during its treatment therein is symbolized by the arrows shown in FIG. 2.

The water to be treated arrives under pressure in the reactor 1 via the pipe 21 of the means 2 provided in the bottom 11 thereof and is essentially uniformly distributed in an upward flow in the reactor 1 via the pipes 22 connected to this pipe 21. Thanks to the arrival under pressure of this water in the reactor 1, the bed of activated carbon present therein is expanded and fluidized. The fluidization velocity is chosen to allow the expansion of the fluidized bed 4 up to a certain height H from the bottom 11 of the reactor while providing above the fluidized bed 4 an area 5 essentially free of activated carbon.

After having passed through the fluidized bed 4 of activated carbon, the water under pressure abuts against the cover 13 of the reactor which acts as a deflector and makes it possible to reverse the direction of the water flow to transform it into downward flow, this downward flow being homogeneous, that is to say able to be distributed homogeneously in the layers of materials present in the annular chamber, and to direct it towards the pipe 33 of the discharge means 3 via the annular chamber 15 containing the sand layer 6.

During its passage through the fluidized bed 5 then through the sand layer 6 and until it leaves the reactor 1, the water flow does not experience any breaking load.

The configuration of the annular chamber 15 around the cylindrical body 12 delimiting the activated carbon fluidization column makes it possible to optimize the footprint of the facility. This facility thus has, with equal adsorption and filtration treatment capacities, a footprint smaller than those of the facilities of the prior art combining a reactor with a fluidized bed of activated carbon operating at atmospheric pressure and a sand filter connected to each other via a pipe provided with a pump, or disposed relative to each other with altimeter setting subjections.

Any fine particles of activated carbon or the suspended matter escaping from the fluidized bed can be treated in the annular chamber.

This pressurized configuration also makes it possible to envisage higher filtration velocities than those which are conventionally implemented in a distinct filtration device receiving the waters coming from a reactor with a fluidized bed of activated carbon operating at atmospheric pressure.

The height of the annular filtration area, linked to the height of the central fluidized bed, also allows the use of higher treatment velocities.

Third Embodiment

This third embodiment incorporates the characteristics of the embodiment represented in FIG. 2 with the following differences.

In the annular chamber 15, two layers of granular or powder material 6 are provided instead of just one. These layers resting on the perforated floor 16 of the annular chamber 15 consist of a layer **6*a* consisting of activated carbon in grains or micrograins and, provided under it, with a layer 6*b*** consisting of sand.

The layer **6*a*** of activated carbon makes it possible to complete the adsorption of pollutants already at least largely carried out in the fluidization column by the fluidized activated carbon and thus to treat possible pollution peaks when they occur or at the very least to offer redundancy of the adsorption treatment making it possible to secure it.

The sand layer **6*b*** makes it possible to reduce the content of suspended matter of the waters before they leave the reactor.

Moreover, the annular chamber 15 is equipped with means for washing the layers of materials provided therein. These means 18 include a pipe for injecting a wash fluid such as water opening out into the space 17 provided under the perforated floor 16 and a pipe 19 for discharging dirty wash waters provided in the upper part of the annular chamber 15. In order to facilitate the discharge of wash waters, the annular chamber is provided in its upper part with a peripheral chute 20 collecting them.

Figure 3:
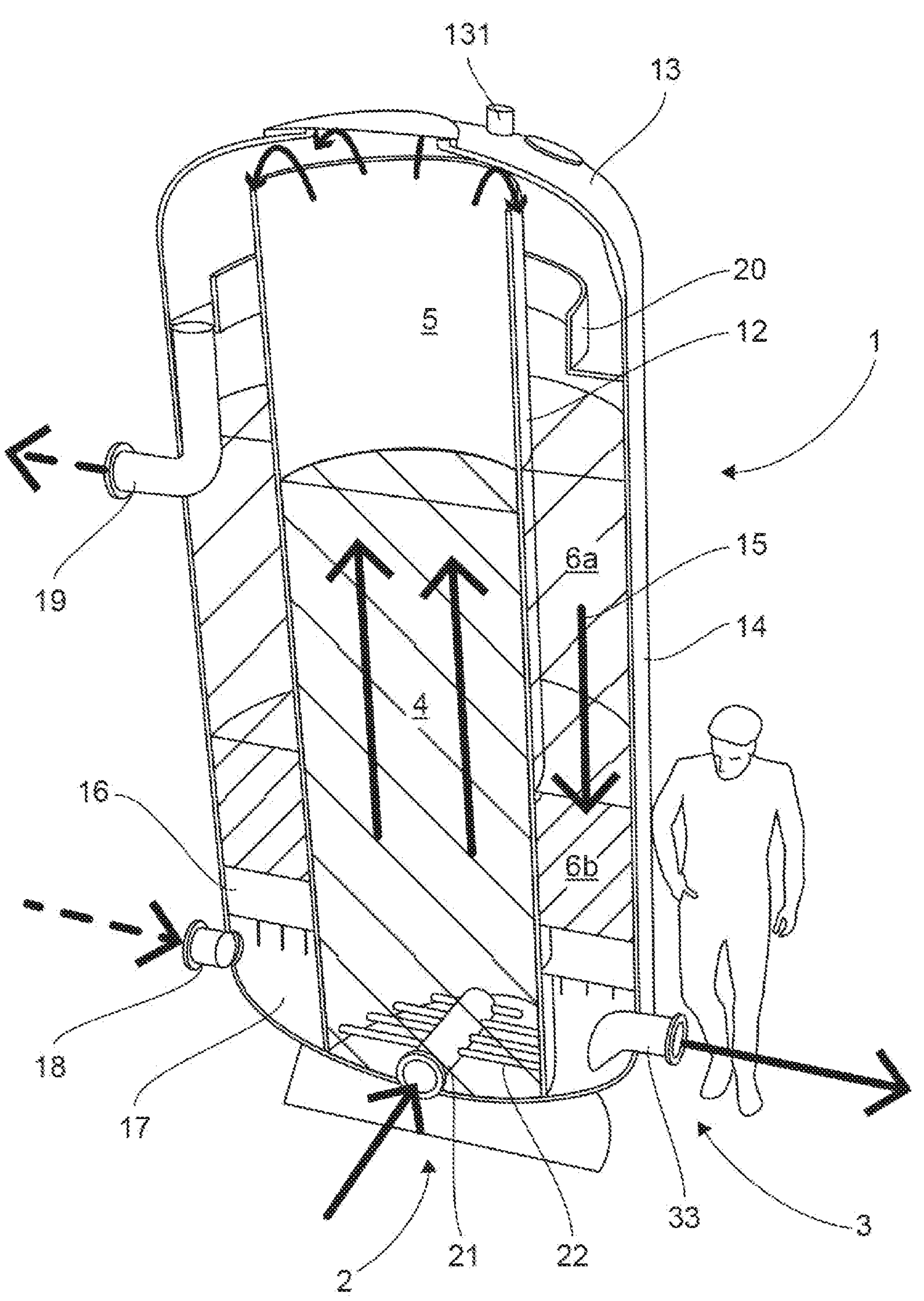
FIG. 3 represents a sectional view of a third embodiment of a facility according to the present invention.

When the layers **6*a* and 6*b* of materials become clogged, the supply of the facility with waters to be treated by the means 2 can be interrupted and a wash fluid can be injected into these layers 6*a* and 6*b*, in an upward flow symbolized by the dotted line arrows shown in FIG. 3**, so as to unclog them.

The facilities described above may be combined into a system by grouping two or more that can operate in parallel, of the same or of different embodiments. The means for supplying water to be treated to the reactors thereof can be common and provided with a system of valves making it possible to distribute the waters to be treated in one or several of these reactors.

The invention claimed is:

1. A facility for the treatment of a fluid comprising:

a reactor accommodating a bed of adsorbent media particles;

means for injecting and distributing a fluid to be treated disposed in the lower part of said reactor configured to form an upward fluid flow within said reactor and allowing the fluidization and expansion of said bed of adsorbent media particles;

means for recovering the fluid having passed through said bed of adsorbent media particles thus fluidized, characterized in that said reactor is a closed reactor forming an enclosure making it possible to implement said treatment under pressure, said enclosure having:

a bottom accommodating said means for injecting and distributing the fluid to be treated;

an essentially cylindrical central body forming a fluidization column;

an essentially cylindrical peripheral body defining an annular chamber around said essentially cylindrical central body delimiting a fluidization column, said annular chamber accommodating at least one layer of a granular or powder material;

a curved cover forming a deflector making it possible to transform said upward flow into a homogeneous downward flow and to direct said downward flow towards said recovery means via said annular chamber.

2. The facility according to claim 1 characterized in that the adsorbent media particles are grains or micrograins chosen from activated carbon, resin, clay, zeolite, manganese dioxide, iron oxyhydroxide, or mixtures thereof.

3. The facility according to claim 1 characterized in that said powder or granular material present in said annular chamber is chosen from the group made up of adsorbent materials, filtration materials, re-mineralization materials, materials with a catalytic effect.

4. The facility according to claim 2, characterized in that said powder or granular material present in said annular chamber is chosen from the group made up of adsorbent materials, filtration materials, re-mineralization materials, materials with a catalytic effect.

5. The facility according to claim 1, characterized in that said annular chamber accommodates at least two layers of powder or granular materials.

6. The facility according to claim 2, characterized in that said annular chamber accommodates at least two layers of powder or granular materials.

7. The facility according to claim 3, characterized in that said annular chamber accommodates at least two layers of powder or granular materials.

8. The facility according to claim 4, characterized in that said annular chamber accommodates at least two layers of powder or granular materials.

9. The facility according to claim 5, characterized in that said annular chamber accommodates at least one layer of a material chosen from granular activated carbon, anthracite, sand, manganese oxide, limestone provided above a sand layer.

10. The facility according to claim 6, characterized in that said annular chamber accommodates at least one layer of a material chosen from granular activated carbon, anthracite, sand, manganese oxide, limestone provided above a sand layer.

11. The facility according to claim 7, characterized in that said annular chamber accommodates at least one layer of a material chosen from granular activated carbon, anthracite, sand, manganese oxide, limestone provided above a sand layer.

12. The facility according to claim 8, characterized in that said annular chamber accommodates at least one layer of a material chosen from granular activated carbon, anthracite, sand, manganese oxide, limestone provided above a sand layer.

13. The facility according to claim 1, characterized in that said means for recovering the fluid having passed through said fluidized bed and possibly through said at least one layer of powder or granular material provided in said annular chamber comprise a discharge pipe provided in the lower part of said reactor.

14. The facility according to claim 1, characterized in that it comprises means for washing said at least one layer of granular or powder material provided in said annular chamber.

15. The facility according to claim 14, characterized in that said annular chamber comprises a perforated floor on which said at least one layer of granular or powder material rests, means for injecting wash waters provided under said floor, means for recovering dirty wash water provided in the upper part of said annular chamber.

16. The facility according to claim 15, characterized in that said means for recovering dirty wash water include a peripheral chute.

17. The facility according to claim 1, characterized in that it comprises additional means chosen from means for injecting particles of new adsorbent media, means for extracting particles of used adsorbent media and means for re-circulating the treated fluid.

* * * * *